(No Model.) 2 Sheets—Sheet 1.

P. J. BARRETT.
HOSE COUPLING.

No. 514,806. Patented Feb. 13, 1894.

WITNESSES:
J. A. Bergstrom
C. Sedgwick

INVENTOR
P. J. Barrett
BY Munn & Co.
ATTORNEYS.

(No Model.) 2 Sheets—Sheet 2.

P. J. BARRETT.
HOSE COUPLING.

No. 514,806. Patented Feb. 13, 1894.

WITNESSES:

INVENTOR

ATTORNEYS.

UNITED STATES PATENT OFFICE.

PATRICK J. BARRETT, OF BOSTON, MASSACHUSETTS, ASSIGNOR OF ONE-HALF TO JOHN J. FRAWLEY, PRESIDENT OF THE BOSTON SOCIETY OF REDEMPTORIST FATHERS, OF SAME PLACE.

HOSE-COUPLING.

SPECIFICATION forming part of Letters Patent No. 514,806, dated February 13, 1894.

Application filed March 29, 1893. Serial No. 468,110. (No model.)

*To all whom it may concern:*

Be it known that I, PATRICK J. BARRETT, of Boston, in the county of Suffolk and State of Massachusetts, have invented a new and Improved Hose-Coupling, of which the following is a full, clear, and exact description.

My invention relates to improvements in hose couplings; and the object of my invention is to produce an extremely simple coupling composed of two similar sections which are adapted to be firmly locked together by simply pushing them together endwise and then giving them a slight twist or turn.

A further object of my invention is to construct and produce a coupling which may be almost instantly united or separated, which is adapted to make an absolutely water tight joint, which is arranged so as to have a perfectly clear and unobstructed water-way through it, and which, by reason of its construction, facilitates the attachment of an electric signal to a hose.

To these ends my invention consists of a hose coupling, the construction of which will be hereinafter described and claimed.

Reference is to be had to the accompanying drawings forming a part of this specification, in which similar figures of reference indicate corresponding parts in all the views.

Figure 1:
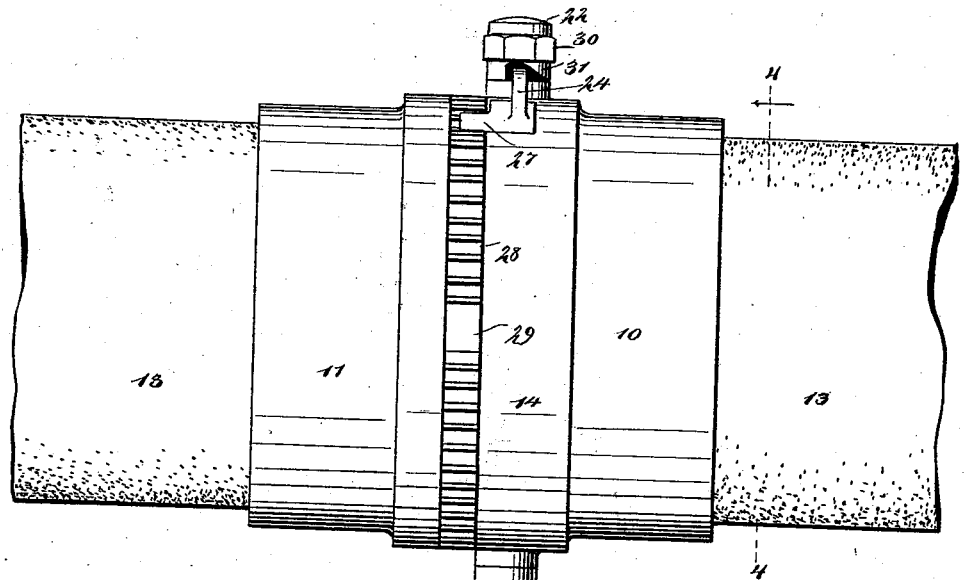
Figure 2:
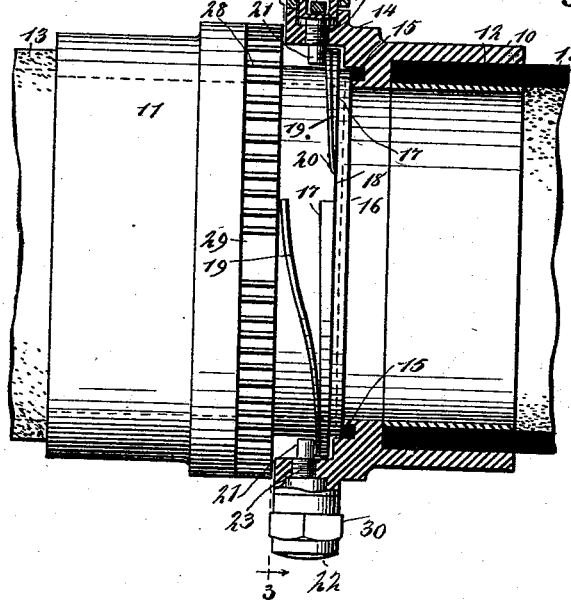
Figure 3:
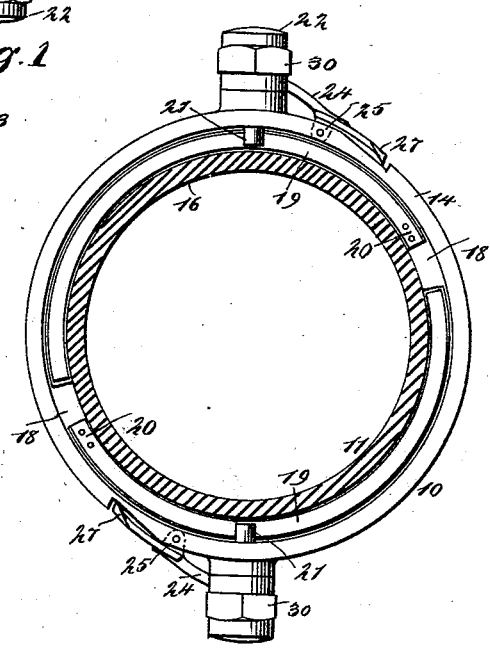
Figure 4:
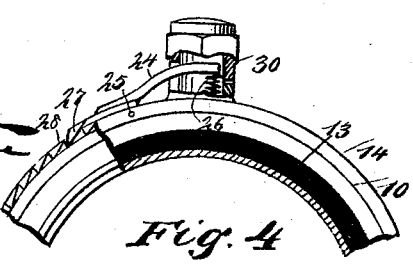
Figure 5:
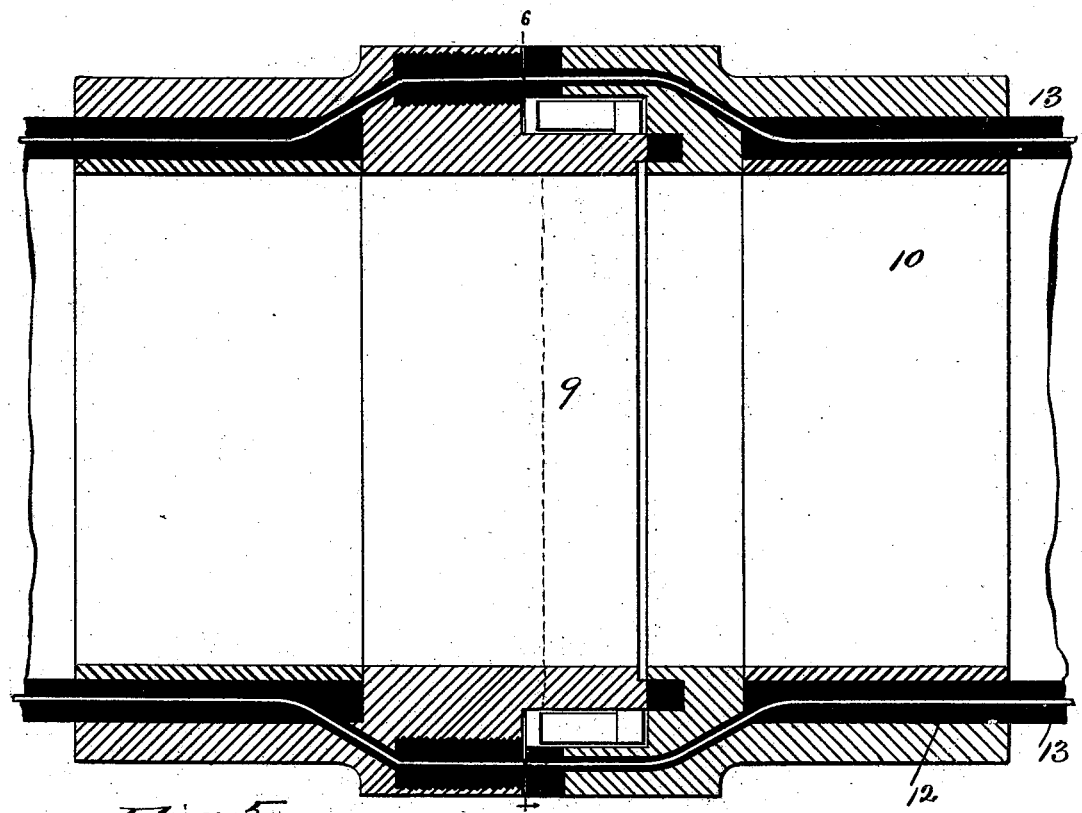
Figure 6:
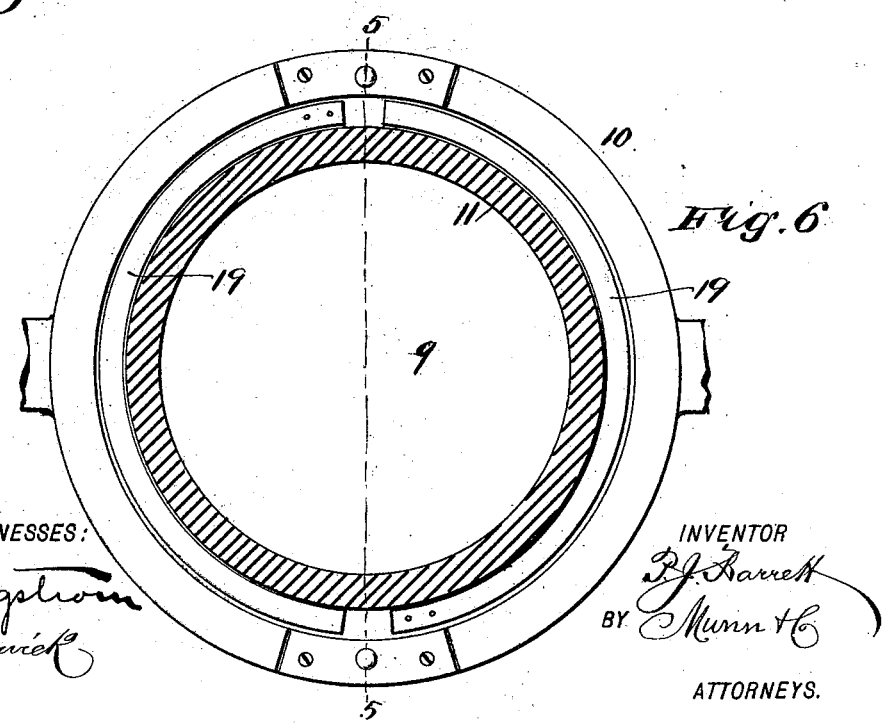

Figure 1 is a side elevation of the coupling embodying my invention, showing it applied to two hose sections and in position to unite or couple the same. Fig. 2 is a broken side elevation with one of the hose sections in longitudinal section. Fig. 3 is a cross section on the line 3—3 in Fig. 2; and Fig. 4 is a broken cross section on the line 4—4 in Fig. 1. Fig. 5 is a longitudinal section of the two coupling sections, showing the arrangement of electrical conductors in connection therewith. Fig. 6 is a cross section, on line 6—6 of Fig. 5.

The hose coupling is provided with two substantially similar parts or sections 10 and 11, each of which is of circular cross section and has, at its outer end, an annular socket 12 to receive the hose section 13. The section 10 has at its inner end an annular and slightly raised flange 14, and in front of the section beneath the flange is an annular socket to receive the packing ring 15 which is adapted to abut with the projecting annular lip 16 of the section 11 and thus make a tight joint. The lip or reduced end 16 of the section 11 is adapted to enter the section 10, beneath the flange 14, and on the opposite sides of the lip and extending nearly half way around it are the elongated cams 17 which are raised upon the outer surface of the lip and the rear walls of which are inclined, as shown clearly in Fig. 2. Between the ends of these cams 17 are openings 18, which are adapted to receive the fastening studs on the section 10, as described presently, and upon the back wall of each cam is secured a spring 19 which is fastened at one end, as shown at 20, and the free end of which swings backward from the cam, as shown in Fig. 2. The object of these springs is to engage and press against the studs 21 so as to insure the necessary frictional engagement with the studs. When the studs are turned so as to slide up the inclined faces of the cams 17, the springs 19 are forced to lie flatwise against the cams but exert a constant tension on the studs. The studs 21 are arranged on diametrically opposite sides of the section 10 and extend inward through the flange 14, the studs being formed on the inner ends of posts 22 which have reduced portions 23 which are screwed into the flange 14, but the studs may be fastened in place in any other convenient way.

The posts 22 are shouldered on the flange 14 and their outer ends are slotted to receive the shanks 24 of the locking pawls, which prevents accidental separation of the coupling sections. The shank 24 is fulcrumed on the flange 14, as shown at 25 in Figs. 3 and 4, and the end in the post is pressed upward by a spring 26, see Fig. 4, while the opposite end is pressed against the flange and this end carries a wide tooth 27 which overlaps the edge of the section 11 and which engages the ratchet teeth 28 on said section. The shank 24 and its tooth 27 thus act as a pawl, which prevents the two sections 10 and 11 from being turned apart. The teeth 28 are broken on one side to form a smooth surface 29 which permits the tooth 27 to slide readily to place, and this smooth surface is arranged so that the tooth 27 will register with it when the studs 21 register with the openings 18 between the cams 17.

When the two sections 10 and 11 are to be fastened together, the studs 21 are placed opposite the openings 18 and the lip 16 pushed into the flange 14, after which the two sections are turned in opposite directions and the studs 21 ride up the inclines of the cams 17, being pressed meanwhile by the springs 19, and as the studs follow up the inclines of the cams, the two sections are pulled tightly together and the pawl on the flange 14, by engaging the teeth 28, prevents the sections from turning back.

On the post 22 is a collar 30, which turns loosely thereon, and which has a cam slot 31 the upper inclined wall of which is adapted to strike the shank 24 of the locking pawl. When the two sections, therefore, are to be released it is only necessary to turn the collar 30 so as to depress the end of the shank 24 which is held in the post 22, and this raises the tooth 27 and permits the sections 10 and 11 to be turned back and separated.

It will be seen from the foregoing description that the two sections have a perfectly clear water-way through them and that they are in close contact with each other. An ordinary electric wire for signaling purposes may be run along the hose sections, being insulated in rubber as shown in Fig. 5. The ends of such wires will pass through longitudinal passages in the coupling sections and terminate flush with the meeting faces of the latter, so as to come in contact when said sections are secured together.

Having thus described my invention, I claim as new and desire to secure by Letters Patent—

1. In a hose coupling, the combination, with two annular sections, having an engaging flange and lip, inclined, separated cams and inwardly-projecting studs adapted to engage said cams, of the dog, or pawl, 27 pivoted to one of said sections, and ratchet teeth which are formed on the other section and engaged by said pawl, a hollow post projecting from one section, a spring arranged within the post and bearing against the shank of the aforesaid pawl, and a revoluble collar arranged on the post and having a cam slot, as described, and for the purpose specified.

2. In a hose coupling, the combination of two annular sections, having an engaging flange and lip, cams and studs, ratchet teeth formed on one section, and a pawl pivoted on the other section and having an extended shank and also arranged transversely to the axis of the coupling, a spring which normally supports said shank, and a movable or adjustable device, held on the section adjacent to the pawl and adapted to engage and depress the shank and thus hold the pawl unlocked from the ratchet, as shown and described.

3. The combination, of the two sections adapted to be fastened together by turning, a series of teeth produced on the exterior of one section, a tilting pawl on the opposite section arranged to engage the teeth, and a revoluble collar journaled adjacent to the pawl and provided with a cam slot to engage the shank of the pawl and release the same, substantially as described.

PATRICK J. BARRETT.

Witnesses:
PATRICK O'LOUGHLIN,
JOHN F. LYNCH.